(12) United States Patent
Howe et al.

(10) Patent No.: US 10,118,847 B2
(45) Date of Patent: Nov. 6, 2018

(54) STRUCTURES FOR THE REDUCTION OF WATER IMPURITIES AND METHODS FOR THE DEPLOYMENT THEREOF

(71) Applicants: Alexander B. Howe, Glen Rock, NJ (US); Jonathan Chin, Norwood, NJ (US); Ethan Donovan, Glen Rock, NJ (US); Matthew Harris, Mahwah, NJ (US); Michael Jiashu Yin, Ridgewood, NJ (US)

(72) Inventors: Alexander B. Howe, Glen Rock, NJ (US); Jonathan Chin, Norwood, NJ (US); Ethan Donovan, Glen Rock, NJ (US); Matthew Harris, Mahwah, NJ (US); Michael Jiashu Yin, Ridgewood, NJ (US)

( * ) Notice: Subject to any disclaimer, the term of this patent is extended or adjusted under 35 U.S.C. 154(b) by 22 days.

(21) Appl. No.: 15/484,803

(22) Filed: Apr. 11, 2017

(65) Prior Publication Data
US 2018/0290909 A1    Oct. 11, 2018

(51) Int. Cl.
| C02F 3/34 | (2006.01) |
| C02F 3/28 | (2006.01) |
| C02F 3/00 | (2006.01) |
| C02F 101/16 | (2006.01) |
| C02F 103/00 | (2006.01) |

(52) U.S. Cl.
CPC ............ C02F 3/348 (2013.01); C02F 3/2806 (2013.01); *C02F 2003/003* (2013.01); *C02F 2101/163* (2013.01); *C02F 2103/007* (2013.01); *C02F 2203/006* (2013.01); *C02F 2301/10* (2013.01)

(58) Field of Classification Search
None
See application file for complete search history.

(56) References Cited

U.S. PATENT DOCUMENTS

| 1,932,383 A | * | 10/1933 | Richardson | A61F 13/2051 |
| | | | | 28/120 |
| 2,905,169 A | * | 9/1959 | Nieburgs | A61B 10/0291 |
| | | | | 600/572 |
| 3,521,637 A | * | 7/1970 | Waterbury | A61F 13/2051 |
| | | | | 604/286 |
| 3,726,277 A | * | 4/1973 | Hirschman | A61F 13/2051 |
| | | | | 604/359 |
| 3,792,979 A | * | 2/1974 | Clinton | C02F 1/688 |
| | | | | 206/0.5 |
| 3,850,160 A | * | 11/1974 | Denson | A61B 10/02 |
| | | | | 600/572 |

(Continued)

*Primary Examiner* — Robert J Popovics
(74) *Attorney, Agent, or Firm* — Leason Ellis LLP

(57) ABSTRACT

Devices are provided herein for the purification of free flowing or semi-free flowing bodies of water by removing impurities, such as nitrates. In one or more implementations, the impurity-removing device includes a cylindrically shaped housing that is open on both ends and defining an inner cavity. A cap is disposed at one opening at one end of the housing, the cap having multiple openings placed through the cap and being sized and shaped to fit the opening at the end of the housing. The impurity-removing device also includes a collection strip on an outer surface of the housing that is colored, sized and shaped to collect heat or energy from the environment, and an impurity-removing medium contained within the inner cavity.

6 Claims, 2 Drawing Sheets

(56) References Cited

U.S. PATENT DOCUMENTS

| | | | | |
|---|---|---|---|---|
| 4,175,008 A | * | 11/1979 | White | A61B 10/0096 206/15.2 |
| 4,217,331 A | * | 8/1980 | Schaub | B01D 11/00 210/167.11 |
| 4,224,898 A | * | 9/1980 | Flagg | A01K 67/033 119/6.5 |
| 4,317,454 A | * | 3/1982 | Bucalo | A61B 10/0045 600/572 |
| 4,473,533 A | * | 9/1984 | Davey | C02F 1/688 210/167.11 |
| 4,630,634 A | * | 12/1986 | Sasaki | C02F 1/688 137/268 |
| 4,798,707 A | * | 1/1989 | Thomas | C02F 1/688 137/268 |
| 4,822,571 A | * | 4/1989 | Nicholson | B01F 1/0027 137/268 |
| D309,493 S | * | 7/1990 | Casberg | D23/208 |
| 5,053,205 A | * | 10/1991 | Taylor | C02F 1/688 210/167.11 |
| 5,350,509 A | * | 9/1994 | Nelson | C02F 1/688 210/198.1 |
| 5,571,540 A | * | 11/1996 | Weyenberg | A61F 13/26 264/296 |
| 5,725,481 A | * | 3/1998 | Buck | A61B 10/0291 600/572 |
| 5,830,154 A | * | 11/1998 | Goldstein | A61B 10/0051 600/572 |
| 6,007,498 A | * | 12/1999 | Buck | A61B 10/0291 600/572 |
| 6,174,293 B1 | * | 1/2001 | Buck | A61B 10/0291 600/572 |
| 6,312,395 B1 | * | 11/2001 | Tripp | A61B 10/0045 600/572 |
| 6,432,371 B1 | * | 8/2002 | Oliver, Jr. | C02F 1/688 210/167.11 |
| 6,524,530 B1 | * | 2/2003 | Igarashi | B01L 3/5029 422/411 |
| 6,582,668 B2 | * | 6/2003 | Green | C02F 1/688 137/268 |
| 6,702,759 B2 | * | 3/2004 | Pevoto | A61B 10/0045 600/562 |
| 6,926,678 B1 | * | 8/2005 | Cesarczyk | A61B 10/0051 600/572 |
| 6,936,013 B2 | * | 8/2005 | Pevoto | A61B 10/0045 600/562 |
| 7,204,824 B2 | * | 4/2007 | Moulis | A61M 25/00 604/290 |
| 7,337,907 B2 | * | 3/2008 | Shah | B01L 3/5021 206/361 |
| 8,287,809 B2 | * | 10/2012 | Gould | A61B 10/0051 422/68.1 |
| 8,353,298 B2 | * | 1/2013 | Braunshteyn | A24D 3/045 131/202 |
| 8,393,335 B1 | * | 3/2013 | Sinclair, Jr. | A24D 1/00 131/353 |
| 8,678,013 B2 | * | 3/2014 | Crooks | A24F 47/006 131/271 |
| 8,905,037 B2 | * | 12/2014 | Lipowicz | A24D 1/00 131/331 |
| 9,033,897 B2 | * | 5/2015 | Benabid | A61B 10/02 600/562 |
| 9,144,420 B2 | * | 9/2015 | Zavala | A61B 10/0291 |
| 9,974,743 B2 | * | 5/2018 | Rose | A61K 9/12 |
| 2001/0008614 A1 | * | 7/2001 | Aronowitz | A61B 10/0051 422/400 |
| 2001/0026942 A1 | * | 10/2001 | Carpenter | A61B 10/0096 436/86 |
| 2002/0197197 A1 | * | 12/2002 | Green | C02F 1/688 422/261 |
| 2004/0105716 A1 | * | 6/2004 | Carlino | A45D 33/26 401/19 |
| 2005/0126977 A1 | * | 6/2005 | Carter | C02F 1/285 210/242.4 |
| 2005/0187507 A1 | * | 8/2005 | Reed | A61F 13/2051 604/1 |
| 2008/0217258 A1 | * | 9/2008 | Buchan | C02F 1/688 210/747.5 |
| 2008/0305548 A1 | * | 12/2008 | Gould | A61B 10/0051 436/2 |
| 2015/0322683 A1 | * | 11/2015 | Edwards | E04H 4/1281 210/86 |

\* cited by examiner

STRUCTURES FOR THE REDUCTION OF WATER IMPURITIES AND METHODS FOR THE DEPLOYMENT THEREOF

FIELD OF THE INVENTION

Embodiments of the invention relate to apparatuses for the purification of free flowing or semi-free flowing bodies of water. More particularly, embodiments of the invention concern a device for the waterbody denitrification and methods for the deployment of such devices.

BACKGROUND OF THE INVENTION

In recent years, coastal hypoxic zones have grown in number and size. Hypoxic zones are areas within a body of water with little or no oxygen, which is an often fatal situation for marine life ranging from shellfish, corals and larger fish that are located in such areas. In the year 2014 for example, the Gulf Coast hypoxic zone ranged for approximately five thousand square miles alone the coastal line.

In a memo dated Sep. 22, 2016, the disclosure of which is incorporated by reference in its entirety, the United States Environmental Protection Agency ("EPA") notes that removing nutrient pollution from waterways is a national priority and cites issues such as Harmful Algae Blooms ("HAB"), as well as other types of algae blooms, found in an increasing number of waterways, as well as the presence of high nitrogen levels in certain drinking water sources. The EPA further notes that, Congress enacted the Harmful Algal Bloom and Hypoxia Research and Control Amendments Act in 2014, which extended the scope of the legislation to include the deployment of solutions to combat freshwater algae blooms and hypoxia.

One major source of nutrient pollution is nitrates and other nitrogen containing compounds, which have the particular effect of increasing the prevalence of intensity of marine algal blooms, such as HABs. More specifically, when algae comprising such blooms die and decompose, specific bacteria consume the organic material, exhausting oxygen and releasing carbon dioxide, thereby creating a hypoxic zone. Such artificially created hypoxic zones amplify hypoxia created by naturally occurring conditions, such as stratification (layering) due to saline or temperature gradients in a body of water.

As indicated above, these oxygen-free hypoxic zones create a significant disturbance to marine life and become notable environmental impacts. Furthermore, there are increasing economic impacts associated with such zone, for example, by negatively affecting coastal fishing and shrimping operations, as well as costal tourism industries. As such, it is reasonable to infer that reducing algal blooms will eventually diminish hypoxic zones.

Nutrient pollution occurs when fertilizer, pet waste, and car exhaust, and other nitrogen rich waste runs into inland waterways, for example, freshwater streams. This type of pollution is referred to as non-source point pollution. Unlike source-point pollution (such as pollution from a factory), which provide for filters or specific designs to limit pollution directly from the source, it is impractical to simply cap or filter non-source point pollution due to the vast number of sources and the complexity of such systems.

The present invention addresses these and other problems by providing a unified, self-contained device that denitrifies the nutrient polluted water when deployed in such waterways.

SUMMARY OF THE INVENTION

According to one aspect of the invention, an impurity-removing device of a type suitable for removing pollutants, such as nitrogen and nitrogen compounds, from nutrient polluted water comprises a cylindrical housing having a cylindrical shape with a first opening at a first end a second opening at a second end, wherein the housing defines an inner cavity. The cylindrical housing may be formed from any type of suitable rigid or semi-rigid, water resistant material, e.g., PCV piping. The device further comprises a cap disposed at the second opening at the second end of the housing, wherein multiple openings are placed through the cap, which is sized and shaped to fit the second opening at the second end of the housing. A collection strip is located on an outer surface of the housing and can be colored, sized and shaped to collect ambient heat or energy from the environment and thereby pass such collected energy to the inner cavity. An impurity-removing medium is contained within the inner cavity of the housing.

According to the present embodiment, water enters the inner cavity, passes through the impurity removing medium and exits the inner cavity with an amount of impurities removed from the water. In an alternative arrangement, the impurity-removing device comprises impurity-removing medium that removes nitrates from water that flows in the first opening, through the housing and out the openings in the cap at the second opening. According to one embodiment, cap that has three circular openings which are sized and shaped to allow liquid to pass through, which may also comprise the housing sized and shaped to allow liquid to pass through.

An impurity removing medium is contained within the inner cavity of the housing. According to various embodiments, the impurity-removing medium is a bioreactor for processing excess nitrogen in water entering the inner cavity. More specifically, one embodiment is directed towards an impurity-removing medium that includes a mixture of carbon, wood, dirt, and bacteria. Such impurity-removing medium is advantageously provided with energy to activate the medium, e.g., to encourage bacteria in the medium intended to process excess nutrients. Accordingly, the collection strip of the impurity-removing device comprises a narrow protrusion in black color, which may run or otherwise cross into the inner cavity. Alternatively, or in conjunction with the foregoing, the collection strip of the impurity-removing device comprise a ridge sized and shaped to stabilize the housing in a submerged environment.

These and other aspects, features, and advantages can be appreciated from the accompanying description of certain embodiments of the invention and the accompanying drawing figures and claims.

DESCRIPTION OF THE DRAWING FIGURES

DETAILED DESCRIPTION OF CERTAIN EMBODIMENTS OF THE INVENTION

By way of overview and introduction, the present invention is described in detail in connection with a unified, compact impurity-removing device for denitrifying nutrient polluted water. Such devices are intended to be placed into waterways or other bodies of water such that nitrogen levels in water passing through such devices is reduced, the effect being the reduction of elimination of HABs and other types of algae blooms, as well as other undesired consequences of elevated levels of nitrogen in water sources.

Figure 1:
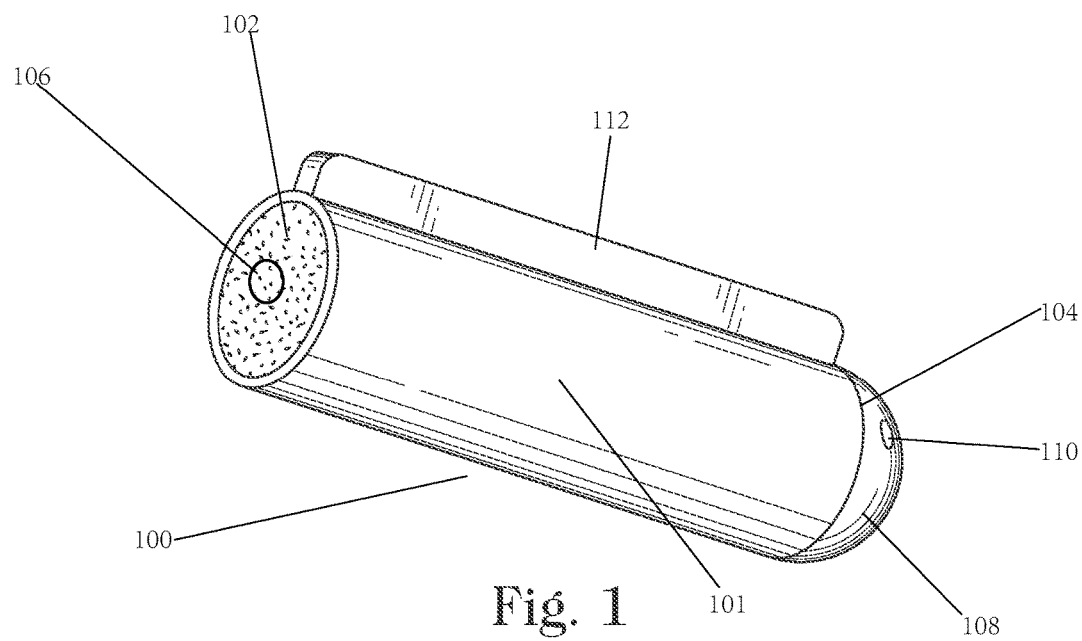
FIG. 1 is a perspective view of an impurity-removing device according to one embodiment of the present invention.
Figure 2:
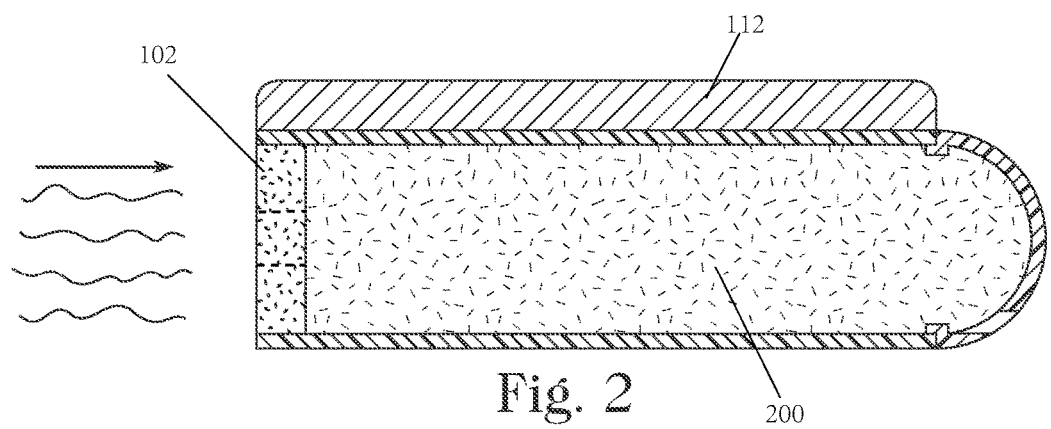
FIG. 2 is a side interior view of an impurity-removing device according to one embodiment of the present invention.
Figure 3:
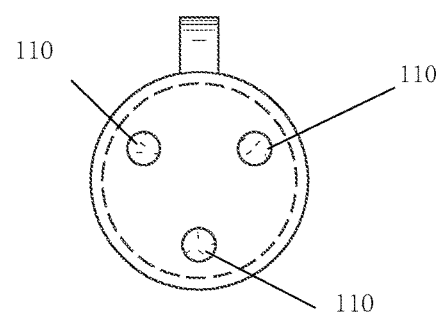
FIG. 3 is a front view of an impurity-removing device according to one embodiment of the present invention.
Figure 4:
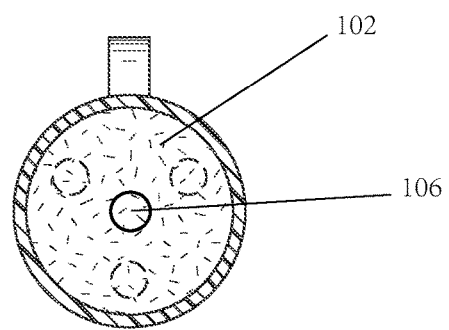
FIG. 4 is a back view of an impurity-removing device according to one embodiment of the present invention.
Figure 5:
FIG. 5 is a side exterior view of an impurity-removing device according to one embodiment of the present invention.
Figure 6:
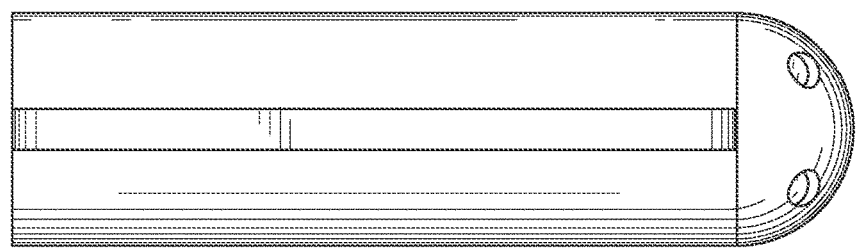
FIG. 6 is a top view of an impurity-removing device according to one embodiment of the present invention.

In at least one embodiment, referring to FIGS. 1 and 2, the impurity-removing device is a cylindrical shaped device 100 that comprises a housing 101, a first end 102 and a second end 104. The first end has an open ingress hole 106 that allows liquid to enter through such ingress hole. The second end is fitted with or covered by a cap 108, which has multiple egress holes 110 (see FIG. 3), and is sized and shaped to the second end 104. A collection strip 112 is located on an outer surface of the housing and is operative to passively collect environmental energy, such as solar radiation, and transfer such energy to the inner cavity that the housing 101 defines.

According to various embodiments, one or more collection strips may be deployed along the outer surface of the housing 101, each of which may take various disparate forms. For example, the collection strip 112 in accordance with one embodiment is a strip shaped member attached or otherwise affixed to the outer surface of the device 100. Alternatively, or in conjunction with the foregoing, the collection strip 112 is a protrusion, such as a ridge shaped member that is molded or otherwise affixed to the cylindrical housing 101. According to other embodiments, the collection strip 122 may collect energy through various combinations of collects active and passive solar heating. Still further, the collection strip 112 can comprise a closed lumen attached or otherwise affixed to the outer surface of the housing 101, wherein the inner cavity of the lumen is filled with a liquid or solid material that is good conductor of heat, e.g. oil, metal, etc. Regardless of the specific embodiment that the collection strip 112 takes, the collection strip 122 transfers heat that it collects to the housing 101, and further to the impurity-removing medium 200, to thereby accelerate the denitrification process.

An impurity-removing medium 200 is contained within the inner cavity of the housing, such as FIG. 2 illustrates, and receives water entering the inner cavity of the housing. According to one embodiment, the impurity-removing medium comprises carbon (e.g., wood chips), dirt, and nitrate consuming bacteria. Those of skill in the art recognize that any suitable bioreactor that is scalable to the dimensions of the housing is suitable for use as the impurity-removing medium. A filter cap 102 may be positioned over the first opening to filter or otherwise prevent large debris from entering the inner cavity of the housing 101. Similarly, the cap 108 affixed to the second opening of the housing 101 of the impurity-removing device comprises circular shaped egress openings 110 that allow for liquid to flow out of the device. It should be noted, however, that the impurity-removing device 100 may be deployed in a reversed manner such that water enters the housing 101 through the openings 110 in the cap 108, pass through the impurity-removing medium and egress through the opposite opening. In one or more embodiments, the impurity-removing device is a funnel shaped as opposed to cylindrical, wherein the first end 102 is sized and shaped larger than the second end 104.

In one or more embodiments, the impurity-removing device is applied in wastewater or nitrogen rich aquatic environments, wherein the water flows through ingress opening 102, percolates through the impurity-removing medium 200, and flows out through egress holes 110 to exit the device. By allowing water to flow through the ingress opening 102 to interact with bacteria and carbon in the impurity removing medium 200, the materials in the absence of oxygen create a biochemical reaction that converts nitrogen in the water to nitrogen gas. The time required to effect the reaction is variable, and the use of egress holes allows the device 100 to retain water in the inner cavity for a number of hours that is a function of the diameter and number of egress openings, e.g., for at least four hours and no more than eight hours. The time could be adjusted as needed based on physical and environmental condition that would allow effective denitrification process or biochemical reaction to complete.

In one or more further embodiments, the impurity-removing device 100 is submerged into a waterway in order to avoid dry spells, which enables the device to stay in an active state of denitrification. The impurity-removing device 100 can also be groups into a series of bodies to accept incoming water for purification, including stacking devices horizontally and vertically in a given waterway.

While the invention has been described in connection with certain embodiments thereof, the invention is not limited to the described embodiments but rather is more broadly defined by the recitations in any claims that follow and equivalents thereof.

What is claimed is:

1. A method of removing nitrates from water comprising the steps of:
   providing an impurity-removing device comprising:
      a housing having cylindrical shape with a first opening at a first end and a second opening at a second end, wherein the housing defines an inner cavity;
      a cap disposed at the second opening at the second end of the housing, wherein multiple openings extend through the cap, the cap being sized and shaped to fit the second opening at the second end housing;
      a collection strip on an outer surface of the housing that is colored, sized and shaped to collect heat or energy from the environment; and
      an impurity-removing medium capable of removing nitrates from water contained within the inner cavity;
   removing nitrates from water by exposing said impurity-removing device to water.

2. The method of claim 1 wherein said exposing is accomplished by flowing water in the first opening, through the housing and out the openings in the cap at the second opening.

3. The method of claim 1 wherein the impurity-removing medium comprises a mixture of carbon, wood, and bacteria.

4. The method of claim 1 wherein the cap comprises three circular openings.

5. The method of claim 1 wherein the collection strip comprises a protrusion, black in color.

6. The method of claim 1 wherein the collection strip comprises a ridge sized and shaped to stabilize the housing in a submerged environment.

\* \* \* \* \*